US012625476B2

(12) United States Patent
Wakitani et al.

(10) Patent No.: US 12,625,476 B2
(45) Date of Patent: May 12, 2026

(54) CONTROL DEVICE

(71) Applicants: HIROSHIMA UNIVERSITY, Higashi-Hiroshima (JP); KOBELCO CONSTRUCTION MACHINERY CO., LTD., Hiroshima (JP)

(72) Inventors: Shin Wakitani, Hiroshima (JP); Toru Yamamoto, Hiroshima (JP)

(73) Assignees: HIROSHIMA UNIVERSITY, Higashi-Hiroshima (JP); KOBELCO CONSTRUCTION MACHINERY CO., LTD., Hiroshima (JP)

( * ) Notice: Subject to any disclaimer, the term of this patent is extended or adjusted under 35 U.S.C. 154(b) by 385 days.

(21) Appl. No.: 18/252,983

(22) PCT Filed: Sep. 29, 2021

(86) PCT No.: PCT/JP2021/035961

§ 371 (c)(1),
(2) Date: May 15, 2023

(87) PCT Pub. No.: WO2022/107456

PCT Pub. Date: May 27, 2022

(65) Prior Publication Data

US 2023/0418241 A1    Dec. 28, 2023

(30) Foreign Application Priority Data

Nov. 20, 2020    (JP) ................................. 2020-193678

(51) Int. Cl.
G05B 13/00    (2006.01)
G05B 13/02    (2006.01)
(52) U.S. Cl.
CPC ................................ G05B 13/021 (2013.01)

(58) Field of Classification Search
CPC .... G05B 13/021; G05B 11/42; G05B 13/042; G05B 2219/42018; G05B 2219/42036;
(Continued)

(56) References Cited

U.S. PATENT DOCUMENTS

2014/0228980 A1*  8/2014  Ohta ..................... G05B 13/021
                                            700/203
2016/0229449 A1*  8/2016  Kleinau ............... B62D 5/0484
(Continued)

FOREIGN PATENT DOCUMENTS

CN        1699732 A    11/2002
CN    2015-148928 A     8/2015
(Continued)

OTHER PUBLICATIONS

Yamamoto (Perforamnce-Adaptive Generalized Predictive Control-Based Proportional-Integral-Derivative Control System and Its Application, attached as pdf) (Year: 2014).*
(Continued)

*Primary Examiner* — Aleksey Olshannikov
(74) *Attorney, Agent, or Firm* — Oblon, McClelland, Maier & Neustadt, L.L.P.

(57) ABSTRACT

A control device includes: a static compensator that calculates, on the basis of a static parameter, a static compensatory input; a dynamic compensator that calculates, on the basis of a dynamic parameter, a dynamic compensatory input; a subtractor that calculates an actual input by synthesizing the static compensatory input and the dynamic compensatory input; an ideal output calculator that calculates an ideal output responsive to a control input by using an input and output model defining an ideal input and output relation between a control input and a control output; and a parameter adjuster that adjusts the static parameter and the
(Continued)

dynamic parameter to minimize a difference between the control output and the ideal output.

2 Claims, 7 Drawing Sheets

(58) Field of Classification Search
CPC .......... G05B 2219/42038; G05B 2219/42043; G05B 13/04; B60Y 2200/412; F16H 61/4148; F16H 61/46; B25J 9/163
See application file for complete search history.

(56) References Cited

U.S. PATENT DOCUMENTS

| | | | | |
|---|---|---|---|---|
| 2018/0301985 A1* | 10/2018 | Kesarwani | ................ | G05F 5/00 |
| 2019/0195189 A1 | 6/2019 | Echenique Subiabre | | |
| 2020/0361592 A1* | 11/2020 | Englund | ................... | B64C 9/12 |

FOREIGN PATENT DOCUMENTS

| | | | |
|---|---|---|---|
| CN | 104898425 A | 9/2015 | |
| CN | 104912677 A | 9/2015 | |
| CN | 106773665 A | 5/2017 | |
| CN | 110297425 A | 10/2019 | |
| CN | 110543097 A | 12/2019 | |
| JP | 6-28006 A | 2/1994 | |
| JP | 2002-312004 A | 10/2002 | |
| JP | 2006-90206 A | 4/2006 | |
| RU | 2 636 603 C1 | 11/2017 | |

OTHER PUBLICATIONS

International Search Report issued on Dec. 7, 2021, in PCT/JP2021/035961, filed on Sep. 29, 2021, citing documents 15-17 & 25 therein, 2 pages.

Hironori Umei et al., "A Design Method of Model Error Compensator for MIMO Systems", Transactions of the Institute of Systems, Control and Information Engineers, 2014, vol. 27, No. 2, pp. 67-72, 10 pages (with partial English translation).

Yasuhito Oshima et al., "Design of a Data-Driven Control system for a Non-Linear System included Derivative Element", The Papers of Technical Meeting on "Control", IEE Japan, CT-16-017, Apr. 4, 2016 (accession date), pp. 1-6, 7 pages (with English Abstract).

Extended European Search Report issued Apr. 10, 2024 in European Application No. 21894331.4, therein, 11 pgs.

Endo, Hiroaki et al., "Online Adjustment Method of Model Error Compensator", Proceedings of the Society of Instrument and Control Engineers, (with English Abstract), vol. 55 No.3, Apr. 18, 2019, (XP93139992), pp. 156-163.

Tomizuka, M. et al., "Modeling and Conventional/Adaptive PI Control of a Lathe Cutting Process", Journal of Dynamic Systems, Measurement and Control, ASME International, US, vol. 110, No. 4, Dec. 1988, (XP008090127), pp. 350-354.

Combined Chinese Office Action and Search Report issued in corresponding Chinese Patent Application No. (with English Translation and English Translation of Category of Cited Documents) citing documents 1, 15-22, 24 and 25 therein, 18 pages.

Li Zhao, et al., "Load Feedforward and Feedback Compounded Compensation Control for Variable Speed Hydraulic Power Supply", Xi'an University of Architecture & Technology, Xi'an, 710055, pp. 805-809 and p. 832, Mar. 3, 2016, (with English Abstract).

An Hui, Analysis and Study on the Electro-hydraulic Loading Method of Multiplexed Pump-valve Control, Taiyuan University of Technology, Sep. 15, 2015, 81 pages (with English Abstract).

* cited by examiner

CONTROL DEVICE

TECHNICAL FIELD

The present invention relates to a control device that controls a controlled object.

BACKGROUND ART

A control device which controls a working machine, such as a hydraulic excavator, is demanded for a complicated control including an automatic operation. The control device demanded for the complicated control has a multi-layered control structure to activate a downstream control loop that directly controls a controlled object in accordance with an instruction from an upstream controller. However, a large fluctuation in input and output characteristics of the controlled object and a large fluctuation in input and output characteristics of the downstream control loop may impair appropriate operation of the upstream controller. Thus, the upstream controller fails to appropriately control the controlled object. Here, maintaining ideal input and output characteristics of the downstream loop succeeds in designing the upstream controller on the basis of the ideal input and output characteristics of the downstream control loop.

Under the circumstances, a technology for suppressing a fluctuation in the input and output characteristics of the downstream control loop has been proposed. For instance, Non-patent Literature 1 discloses a control device including: an input and output model ($P_m$) indicating ideal input and output characteristics of a control input (u') which is input from an upstream controller and a control output (y) which is output from a controlled object; a compensator (D) that generates a compensatory input ($u_c$) for reducing a model error or difference between an ideal output ($y_m$) of the input and output model ($P_m$) responsive to the control input (u') and the control output (y); and a subtractor that calculates an actual input (u) to the controlled object by subtracting the compensatory input ($u_c$) from the control input (u').

However, when the input and output characteristics of the controlled object largely fluctuate in the technology of Non-patent Literature 1, the compensator cannot sufficiently compensate the fluctuation. Hence, the upstream controller fails to appropriately control the controlled object.

CITATION LIST

Non-Patent Literature

Non-patent Literature 1: Umei, Okajima, Matsunaga, and Asai (2014), "A design Method of Model Error Compensator for MIMO systems", The Institute of Systems, Control and Information Engineers, Vol. 27, No. 2, PP. 67-72

SUMMARY OF INVENTION

The present invention has been accomplished to solve the aforementioned drawbacks with an aim of providing a control device that achieves an appropriate control of a controlled object by using a controller in an initial design even when input and output characteristics of the controlled object largely fluctuate.

A control device according to one aspect of the present invention is a control device that controls a controlled object. The control device includes: a controller that calculates a control input to eliminate an error between a target output and a control output which is output from the controlled object; a static compensator that calculates, on the basis of a static parameter and the control input, a static compensatory input to compensate a fluctuation in static characteristics of the controlled object; a dynamic compensator that calculates, on the basis of a dynamic parameter and the control output, a dynamic compensatory input to compensate a fluctuation in dynamic characteristics of the controlled object; a synthesizer that calculates an actual input by synthesizing the static compensatory input and the dynamic compensatory input, and inputs the calculated actual input to the controlled object; an ideal output calculator that calculates an ideal output responsive to the control input by using an input and output model defining an ideal input and output relation between the control input and the control output; and a parameter adjuster that adjusts each of the static parameter and the dynamic parameter to minimize a difference between the control output and the ideal output.

This configuration achieves an appropriate control of the controlled object by using a controller in an initial design even when the input and output characteristics of the controlled object largely fluctuate.

BRIEF DESCRIPTION OF DRAWINGS

FIG. 4 is a hydraulic circuit diagram of a hydraulic motor control system used as a controlled object.

FIG. 6 includes graphs respectively showing results of adjusting a static gain, a proportional gain, and a derivative gain.

FIG. 7 includes enlarged graphs of the graphs in FIG. 6.

DESCRIPTION OF EMBODIMENTS

Figure 1:
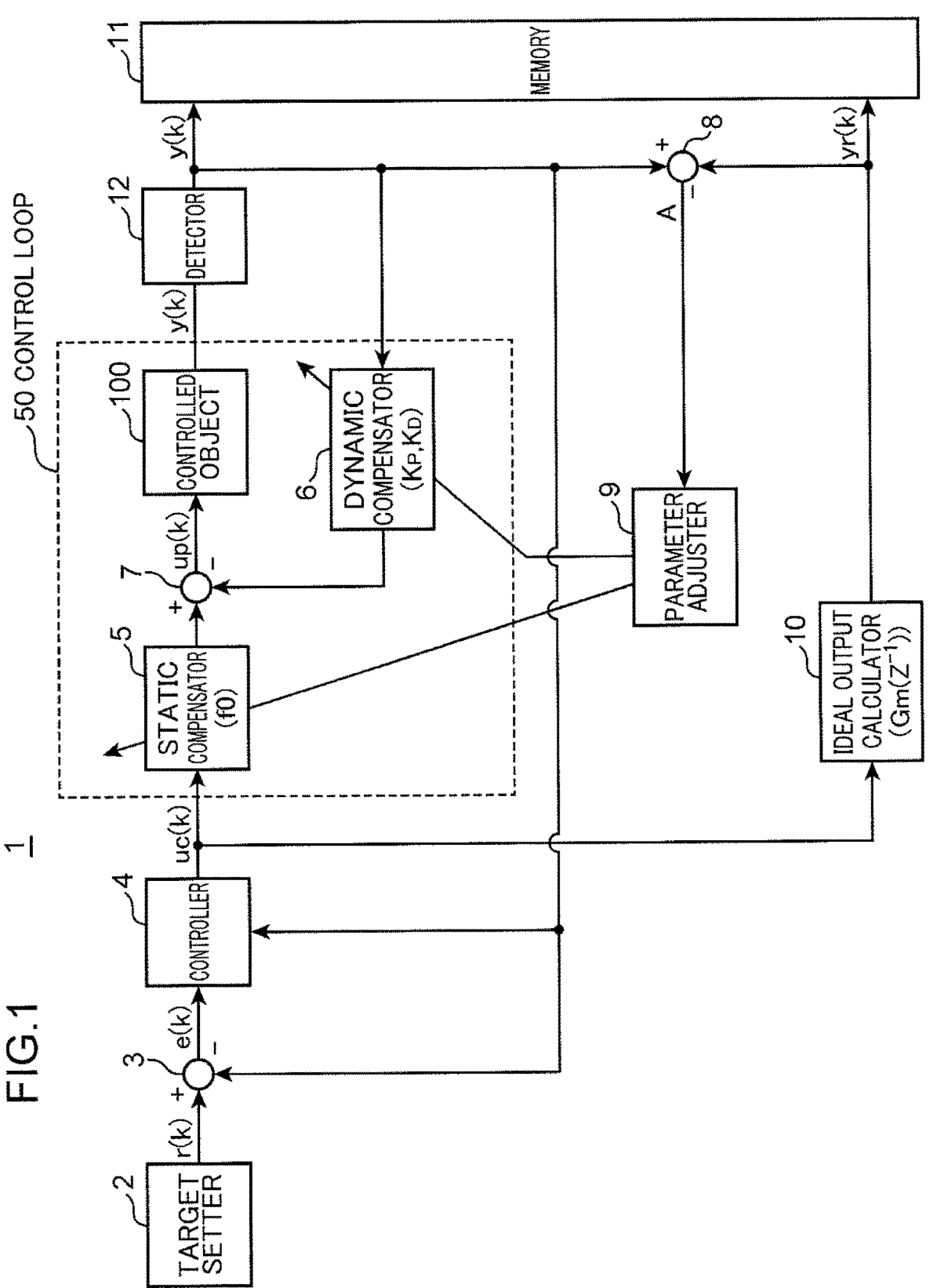
FIG. 1 is a block diagram showing an example of a configuration of a control device according to an embodiment of the present invention.

Hereinafter, an embodiment of the present invention will be described with reference to the accompanying drawings. FIG. 1 is a block diagram showing an example of a configuration of a control device 1 according to an embodiment of the present invention. The control device 1 controls a controlled object 100 that outputs a control output y(k) in response to an actual input $u_p$(k). The controlled object 100 may be, for example, a working machine including a hydraulic excavator and a hydraulic crane, or may be an automobile. In detail, the controlled object 100 may be a hydraulic system included in the working machine, or an automatic braking system included in the automobile. The sign "k" enclosed in parentheses indicates a time.

The control device 1 includes a target setter 2, a subtractor 3, a controller 4, a static compensator 5, a dynamic compensator 6, a subtractor 7 (which is an example of the synthesizer), a parameter adjuster 9, a subtractor 8, an ideal output calculator 10, a memory 11, and a detector 12. Each of the target setter 2, the subtractor 3, the controller 4, the static compensator 5, the dynamic compensator 6, the subtractor 7, the subtractor 8, the parameter adjuster 9, and the ideal output calculator 10 includes a processor, e.g., a CPU or an ASIC. The target setter 2, the memory 11, and the detector 12 may be excluded from the constituent elements of the controlled object 100.

The target setter 2 sets a target output r(k) representing a target of the control output y(k). The target output r(k) adopts various values depending on the controlled object 100. For instance, when the controlled object 100 is a working machine, a target rotation number to an electric motor for stewing an upper slewing body is adopted. For instance, in a case where the controlled object 100 is controlled in such a manner that the control output y(k) follows a predetermined target pattern, the target output r(k) adopts chronological data of target values forming the target pattern. The target output r(k) may represent, for example, a target value corresponding to an actuation amount given to a manipulation lever for operating a working device or the upper stewing body. The target output r(k) may adopt, for example, a fixed value which has been predetermined.

The subtractor 3 calculates an error e(k) by subtracting the control output y(k) from the target output r(k).

The controller 4 calculates, on the basis of the control output y(k), a control input $u_c(k)$ to eliminate the error e(k). The controller 4 corresponds to the upstream controller described in Background Art. The controller 4 may calculate the control input $u_c(k)$ to eliminate the error e(k) under, for example, a FID control. Examples of a formula to be used for the PID control include Equation (17) which will be described later. The controller 4 may calculate the control input $u_c(k)$ by using various feedback controls including a P control, a PD control, and a PI control in place of the PID control, or a feedforward control.

The static compensator 5 calculates a static compensatory input for compensating a fluctuation in static characteristics of the controlled object 100 by multiplying the control input $u_c(k)$ by a static gain $f_0$ (which is an example of the static parameter). The static characteristics stand for time independent characteristics of the controlled object 100. The static characteristics correspond to, for example, a scale available to the control output y(i). The static gain $f_0$ is a gain for compensating the fluctuation in the static characteristics. For instance, the actual input $u_p(k)$ excessively reduces as a dynamic compensatory input calculated by the dynamic compensator 6 excessively increases, and thus, a value of the control output y(k) decreases more largely than an estimated scale. To avoid this situation, the static compensator 5 multiplies the control input $u_c(k)$ by the static gain $f_0$.

The dynamic compensator 6 calculates, on the basis of a dynamic gain (which is an example of the dynamic parameter) and the control output y(k), a dynamic compensatory input for compensating a fluctuation in dynamic characteristics of the controlled object 100. The dynamic characteristics stand for time dependent characteristics of the controlled object 100, e.g., rise characteristics and damping characteristics. The dynamic gain is a gain for compensating the fluctuation in the dynamic characteristics. The dynamic gain includes, for example, a proportional gain $K_p$ and a derivative gain $K_D$. The dynamic compensator 6 calculates the dynamic compensatory input with, for example, an arithmetic expression of "$K_p \cdot y(k) + K_D \cdot \Delta y(k)$". Here, the sign "$\Delta y(k)$" denotes a differential of y(k).

The subtractor 7 calculates the actual input $u_p(k)$ by subtracting the dynamic compensatory input from the static compensatory input, and inputs the actual input $u_p(k)$ to the controlled object 100. In this way, the control input $u_c(k)$ is adjusted to compensate the dynamic characteristics and the static characteristics of the controlled object 100. The actual input $u_p(k)$ is expressed by, for example, the following equation.

$$u_p(k) f_0 \cdot u_c(k) - K_p \cdot y(k) - K_D \cdot \Delta y(k)$$

The static compensator 5, the dynamic compensator 6, the subtractor 7, and the controlled object 100 constitute a control loop 50. The control loop 50 represents a downstream control loop that directly controls the controlled object 100. The control loop 50 outputs a control output y(k) in response to the control input $u_c(k)$.

The ideal output calculator 10 calculates an ideal output $y_r(k)$ responsive to the control input $u_c(k)$ by using an input and output model $G_m(z^{-1})$ which is a transfer function indicating an ideal input and output relation between the control input $u_c(k)$ and the control output y(k). The ideal input and output relation represents a relation between the control input $u_c(k)$ and the control output y(k) at the time of designing the controller 4. Hereinafter, the relation between the control input $u_c(k)$ and the control output y(k) is referred to as input and output characteristics of the control loop 50. For instance, in a case where the controller 4 is designed on the basis of initial input and output characteristics of the control loop 50 including the initial controlled object 100, an input and output model has initial input and output characteristics of the control loop 50. Therefore, the ideal output calculator 10 can calculate an ideal output $y_r(k)$ in accordance with the initial input and output characteristics of the control loop 50, even when the input and output characteristics of the controlled object 100 change from the initial characteristics, and the input and output characteristics of the control loop 50 change from the initial input and output characteristics. The input and output model $G_m(z^{-1})$ is expressed by, for example, Equations (19), (20), (21) to be described later.

The subtractor 8 calculates a difference A by subtracting the ideal output $y_r(k)$ from the control output y(k), and inputs the difference A to the parameter adjuster 9.

The parameter adjuster 9 adjusts each of the static gain $f_0$ and the dynamic gain ($K_p$, $K_D$) to minimize the difference A input from the subtractor 8. The parameter adjuster 9 may calculate the static gain $f_0$ and the dynamic gain ($K_p$, $K_D$) by, for example, the recursive least squares. In this case, the static gain $f_0$ and the dynamic gain ($K_p$, $K_D$) are adjusted in synchronization with a sampling time of the control device 1. Specifically, the static gain $f_0$ and the dynamic gain ($K_p$, $K_D$) are adjustable online. One adoptable way using the recursive least squares is to minimize an evaluation function J shown in Equation (9), which will be described later, by using Equations (10) to (16).

The memory 11 includes, for example, a RAM or a flush memory. The memory 11 stores the control output y(k) and the ideal output $y_r(k)$. The memory 11 may store control outputs y(k) and ideal outputs $y_r(k)$ calculated in a period from a time k to a couple of previous sample points.

The detector 12 includes, for example, a sensor to detect the control output y(k) which is output from the controlled object 100. For instance, when the controlled object 100 includes an actuator, the detector 12 includes a sensor to detect a state of the actuator. For instance, when the controlled object 100 includes an electric motor for slewing the upper slewing body, the detector 12 includes a sensor to detect a rotation number of the electric motor.

Figure 2:
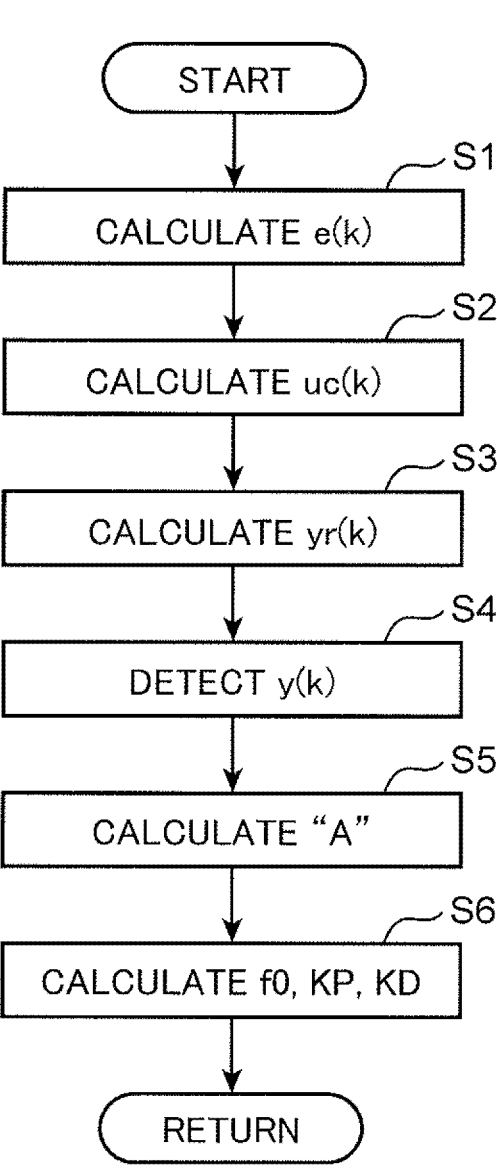
FIG. 2 is a flowchart showing an example of a process by the control device.

Next, a process by the control device 1 will be described. FIG. 2 is a flowchart showing an example of the process by the control device 1. In step S1, the subtractor 3 calculates an error e(k) by subtracting a control output y(k) from a target output r(k).

In step S2, the controller 4 calculates a control input $u_c(k)$ by inputting the error e(k) and the control output y(k) to Equation (17).

In step S3, the ideal output calculator 10 calculates an ideal output $y_r(k)$ by multiplying the control input $u_c(k)$ by an input and output model $G_m(z^{-1})$ expressed by Equation (19).

In step S4, the detector 12 detects a control output $y(k)$ which is output from the control loop 50 in response to the control input $u_c(k)$.

In step S5, the subtractor 8 calculates a difference A by subtracting the ideal output $y_r(k)$ from the control output $y(k)$ detected by the detector 12.

In step S6, the parameter adjuster 9 calculates a static gain $f_0$ and a dynamic gain $(K_p, K_D)$ by using the recursive least squares to minimize the difference A. When step S6 is finished, the flow is returned to step S1. In this way, the static gain $f_0$ and the dynamic gain $(K_p, K_D)$ are adjusted one after another.

As described heretofore, the control device 1 calculates the ideal output $y_r(k)$ responsive to the control input $u_c(k)$ by using the input and output model $G_m(z^{-1})$ indicating ideal input and output characteristics of the control input $u_c(k)$ and the control output $y(k)$, and adjusts the static gain $f_0$ belonging to the static compensator 5 and the dynamic gain $(K_p, K_D)$ belonging to the dynamic compensator 6 to minimize the difference A between the ideal output $y_r(k)$ and the control output $y(k)$. In this manner, even when the input and output characteristics of the controlled object 100 largely fluctuate, the input and output characteristics of the control input $u_c(k)$ and the control output $y(k)$ are maintained to ideal input and output characteristics at the time of designing the controller 4. Hence, even when the input and output characteristics of the controlled object 100 largely fluctuate, the controlled object 100 is appropriately controllable by using the controller 4 in the initial design. This consequently achieves simplification of the design of the controller 4 and facilitates development of the control device 1.

The present invention can adopt modifications described below.

(1) The parameter adjuster 9 may adjust a static gain $f_0$ and a dynamic gain $(K_p, K_D)$ by using a database drive-type control way. The database drive-type control way includes calculating a parameter suitable for a current state of a controlled object on the basis of a parameter having been calculated in past and stored in a database.

In the case of adopting this way, the control device 1 further includes a database that stores a static gain $f_0$ and a dynamic gain $(K_p, K_D)$ having been calculated in past. The parameter adjuster 9 acquires, from the memory 11, a request point indicating the current state of the controlled object 100. The request point includes, for example, control outputs $y(k)$ and ideal outputs $y_r(k)$ from a certain sample point to a couple of previous sample points. The parameter adjuster 9 calculates a distance between the request point and each of parameter sets stored in the database, and extracts k-parameter sets in short distance order. The parameter set includes, for example, a set of a static gain $f_0$, a proportional gain $K_p$, and a derivative gain KID. The parameter adjuster 9 obtains a weighting factor for each of the extracted k-parameter sets such that a value of the factor is larger as the distance is shorter. The parameter adjuster 9 averages the k-parameter sets by using the obtained weighting factor, calculates a final parameter set, and defines the final parameter set as the static gain $f_0$ and the dynamic gain (K r, KO.

(2) An arithmetic expression for use in calculating a dynamic compensatory input by the dynamic compensator 6 may include a product of a quadratic derivative term and a quadratic derivative gain of the control output $y(k)$. Besides, the arithmetic expression may include a value obtained by adding the product of the i-th derivative term and the i-th derivative gain of the control output $y(k)$ from i=1 to i=n, where the sign "n" denotes a positive integer.

EXAMPLE

Figure 3:
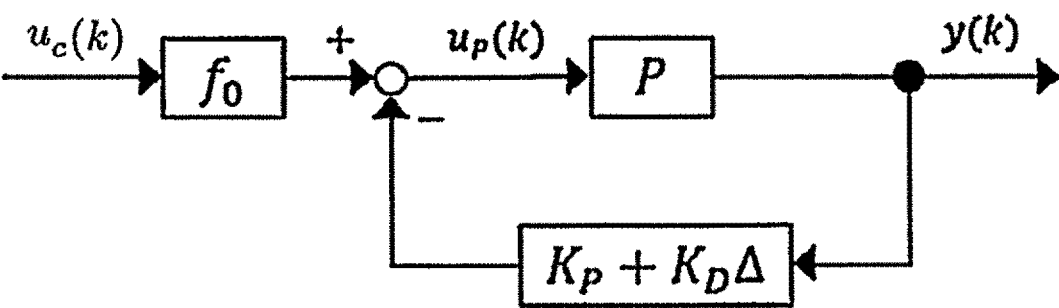
FIG. 3 is a block diagram showing a feedback system constituting a control loop.

Next, Example of the present invention will be described. First, the design of the control loop 50 will be described. FIG. 3 is a block diagram showing a feedback system constituting the control loop 50. The feedback system is expressed by the following formula.

Formula 1

$$u_p(k)=f_0(k)u_c(k)-K_P(k)y(k)-K_D(k)\Delta y(k) \tag{1}$$

Here, the signs "$u_p(k)$", "$y(k)$", "$u_c(k)$", and "P" respectively denote an actual input, a control output, a control input, and a controlled object. Further, the sign "$\Delta$" denote a difference operator, and a backward operator $z^{-1}$ is used to express "$\Delta=1-z^{-1}$". The signs "$f_0(k)$", "$K_p(k)$", "$K_D(k)$" respectively denote parameters. The parameter adjuster 9 tunes the parameters $f_0(k)$, $K_p(k)$, $K_D(k)$ online by using the recursive least squares. The recursive least squares has a merit of a low calculation cost. The parameter adjuster 9 calculates a parameter of each of the static compensator 5 and the dynamic compensator 6 from operational data including the actual input $u_p(k)$ and the control output $y(k)$.

Subsequently, a way of adjusting each parameter on the basis of the operational data will be described. Assuming that the equation "$f_0(k)=0$" is not satisfied, Equation (1) is changed as follows.

Formula 2

$$u_c(k) = \frac{1}{f_0(k)}u_p(k) + \frac{K_P(k) + K_D(k)}{f_0(k)}y(k) - \frac{K_D(k)}{f_0(k)}y(k-1) \tag{2}$$

$$= \theta_1(k)u_p(k) + \theta_2(k)y(k) + \theta_3(k)y(k-1) \tag{3}$$

$$\theta_1(k) = \frac{1}{f_0(k)}, \theta_2(k) = \frac{K_P(k) + K_D(k)}{f_0(k)}, \theta_3(k) = -\frac{K_D(k)}{f_0(k)} \tag{4}$$

However, in Equation (3), parameters "$\theta_1(k)$", "$\theta_2(k)$", "$\theta_3(k)$" are expressed by Equation (4).

Moreover, a response obtainable in inputting of the control input $u_c(k)$ to the input and output model $G_m(z^{-1})$ indicating an ideal transfer function of the control loop 50 is defined as an ideal output $y_r(k, \theta(k))$. In this case, the ideal output $y_r(k, \theta(k))$ is expressed by Equation (5).

Formula 3

$$y_r(k,\theta(k))=G_m(z^{-1})u_c(k,\theta(k)) \tag{5}$$

The following Formula is obtainable from the relation between Equation (3) and Equation (5).

Formula 4

$$y_r(k,\theta(k))=\theta_1\hat{u}_p(k)+\theta_2\hat{y}(k)+\theta_3\hat{y}(k-1) \tag{6}$$

$$\hat{u}_p(k)=G_m(z^{-1})u_p(k) \tag{7}$$

$$\hat{y}(k)=G_m(z^{-1})y(k) \tag{8}$$

An evaluation function J is defined as follows.

Formula 5

$$J = \frac{1}{N} \sum_{k=1}^{N} \{y(k) - y_r(k, \theta(k))\}^2 \qquad (9)$$

However, the sign "N" denotes a sum of data, and the parameter $\theta(k)$ is adjusted in such a manner that the control output y(k) follows the ideal output $y_r(k)$ by minimizing the evaluation function. Use of the optimized parameter allows input and output characteristics of the control loop 50 including the static compensator 5, the dynamic compensator 6, and the controlled object 100 to agree with input and output characteristics of the input and output model $G_m(z^{-1})$.

Next, the recursive least squares shown below is adopted to minimize the square sum in Equation (9).

Formula 6

$$\theta(k) = \theta(k-1) + K(k)\{y(k) - y_r(k, \theta(k))\} \qquad (10)$$

$$K(k) = \frac{\Gamma(k-1)\psi(k)}{\omega + \psi^T(k)\Gamma(k-1)\psi(k)} \qquad (11)$$

$$\Gamma(k) = \frac{1}{\omega}\left\{\Gamma(k-1) - \frac{r(k-1)\psi(k-1))\psi^T(k-1)\Gamma(k-1)}{\omega + \psi^T(k-1)\Gamma(k-1)\psi(k-1)}\right\} \qquad (12)$$

The sign "$\omega$" denotes a forgetting factor. The signs "$\theta(k)$" and "$\psi(k)$" are expressed by the following formula.

Formula 7

$$\theta(k)[\theta_1(k)\theta_2(k)\theta_3(k)]^T \qquad (13)$$

$$\psi(k) = G_m(z^{-1})[u_p(k)y(k)y(k-1)]^T \qquad (14)$$

An initial value $\Gamma(0)$ of an error covariance matrix $\Gamma(k)$ and an initial value $\theta(0)$ of an estimative value $\theta(k)$ are defined by the following formula.

Formula 8

$$\Gamma(0) = \alpha I \qquad (15)$$

$$\theta(0) = [\theta_1(0)\theta_2(0)\theta_3(0)]^T \qquad (16)$$

The sign "$\alpha$" is a certain real number satisfying "$\alpha > 0$". The sign "I" denotes an identity matrix of 3×3. The sign "$\theta_i(0)$" denotes a certain real number. The real number $\theta_i(0)$ is defined as not "0" under the condition that the gain $f_0$ is not "0".

Next, a configuration of the control device 1 according to Example will be described. The control device 1 is illustrated in FIG. 1.

The control loop 50 represents a downstream control loop formed of a feedback-proportional derivative (F-PD) control system. The controller 4 represents an upstream control loop. The controller 4 is formed of a PID (proportional-integral-derivative) control system having a fixed control parameter.

In the configuration in FIG. 1, the parameter of each of the static compensator 5 and the dynamic compensator 6 is adjusted so that the input and output characteristics of the control loop agree with the input and output characteristics of the input and output model $G_m(z^{-1})$. In this manner, the downstream control loop 50 has input and output characteristics equivalent to those of the input and output model $G_m(z^{-1})$. As a result, the upstream controller 4 can be designed on the basis of the ideal input and output model $G_m(z^{-1})$.

The controller 4 in Example is formed of a PID control system expressed by Equation (17).

Formula 9

$$u_C(k) = k_c\left\{\frac{1}{T_I}e(k) - \Delta y(k) - T_D\Delta^2 y(k)\right\} \qquad (17)$$

$$e(k) = r(k) - y(k) \qquad (18)$$

The sign "$k_c$" denotes a proportional gain, the sign "$T_1$" denotes an integration time [s], and the sign "$T_D$" denotes a derivative time [s].

Subsequently, a simulation applying the control device 1 according to Example to a hydraulic motor control system will be described.

Figure 4:
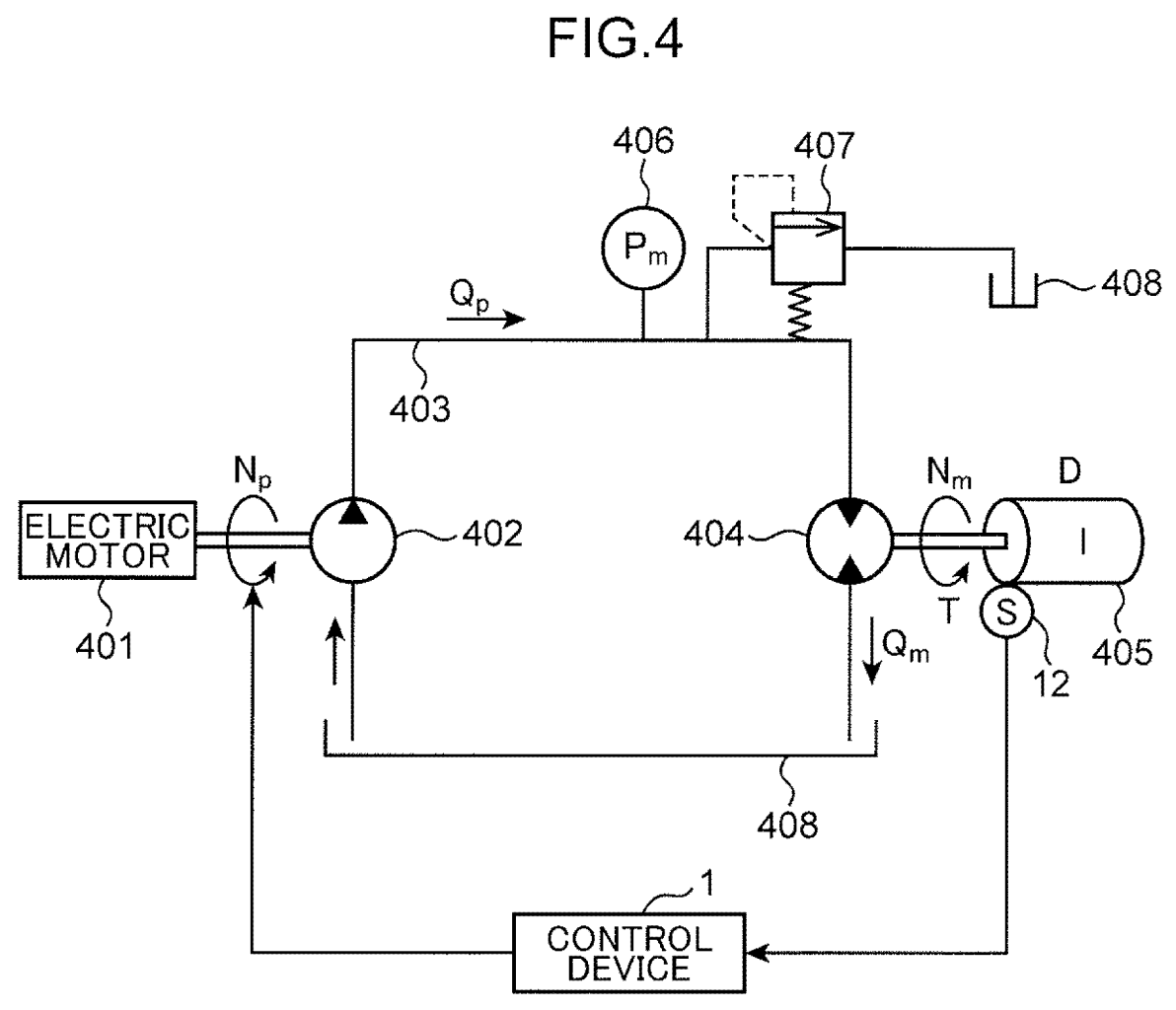

FIG. 4 is a hydraulic circuit diagram of a hydraulic motor control system used as the controlled object 100. The hydraulic motor control system includes an electric motor 401 or a servo motor, a hydraulic pump 402, a pipe 403, a hydraulic motor 404, an inertial article 405, a hydraulic sensor 406, a relief valve 407, an oil tank 408, and the control device 1.

The control device 1 inputs an instructive rotation number $N_p$ expressed at an analog voltage to the electric motor 401. The electric motor 401 is driven in accordance with the instructive rotation number $N_p$. The hydraulic pump 402 is connected to the electric motor 401 to rotate with a power from the electric motor 401. The rotation of the hydraulic pump 402 allows hydraulic fluid to flow from the oil tank 408 into the pipe 403. The hydraulic fluid is pushed by the hydraulic pump 402 at a discharge flow rate $Q_p$ to generate a pressure $P_m$ in the pipe 403. The hydraulic motor 404 rotates with a hydraulic power T under the pressure $P_m$.

A rotation number of the hydraulic motor 404 is denoted by "$N_m$", and an inertial moment and a viscous damping coefficient of the inertial article 405 are respectively denoted by "I" and "D". The hydraulic fluid used as the power of the hydraulic motor 404 returns to the oil tank 408 so as to be reused by the hydraulic pump 402.

The control device 1 causes the detector 12 to detect the rotation number $N_m$, and calculates an instructive rotation number $N_p$ so that the detected rotation number $N_m$ reaches a target rotation number. The instructive rotation number $N_p$ corresponds to the actual input $u_p(k)$, and the rotation number $N_m$ corresponds to the control output y(k).

Next, inspection about Example by a simulation model of the hydraulic motor control system will be described.

In the inspection, the ideal input and output model $G_m(z^{-1})$ of the control loop 50 is designed as follows.

Formula 10

$$G_m(z^{-1}) = \frac{z^{-1}P(1)}{P(z^{-1})} \qquad (19)$$

The denominator $P(z^{-1})$ is expressed by the following formula. The coefficients $p_1$, $p_2$ are expressed by the following formula.

Formula 11

$$P(z^{-1}) = 1 + \rho 1 \cdot z^{-1} + \rho 2 \cdot z^{-2} \qquad (20)$$

$$\begin{cases} p_1 = -2\exp\left(-\dfrac{\rho}{2\mu}\cos\left(\dfrac{\sqrt{4\mu-1}}{2\mu}\rho\right)\right) \\[2mm] p_2 = \exp\left(-\dfrac{\rho}{\mu}\right) \\[2mm] p = \dfrac{T_s}{\sigma} \\[2mm] \mu = 0.25(1-\delta) + 0.51\delta \end{cases} \qquad (21)$$

The sign "$T_s$" denotes a sampling time, the signs "$\sigma$", "$\delta$" respectively denote dynamic parameters, such as rise characteristics and damping characteristics, of the controlled object 100. A designer appropriately sets the dynamic parameters on the basis of the input and output characteristics of the controlled object 100.

Figure 5:
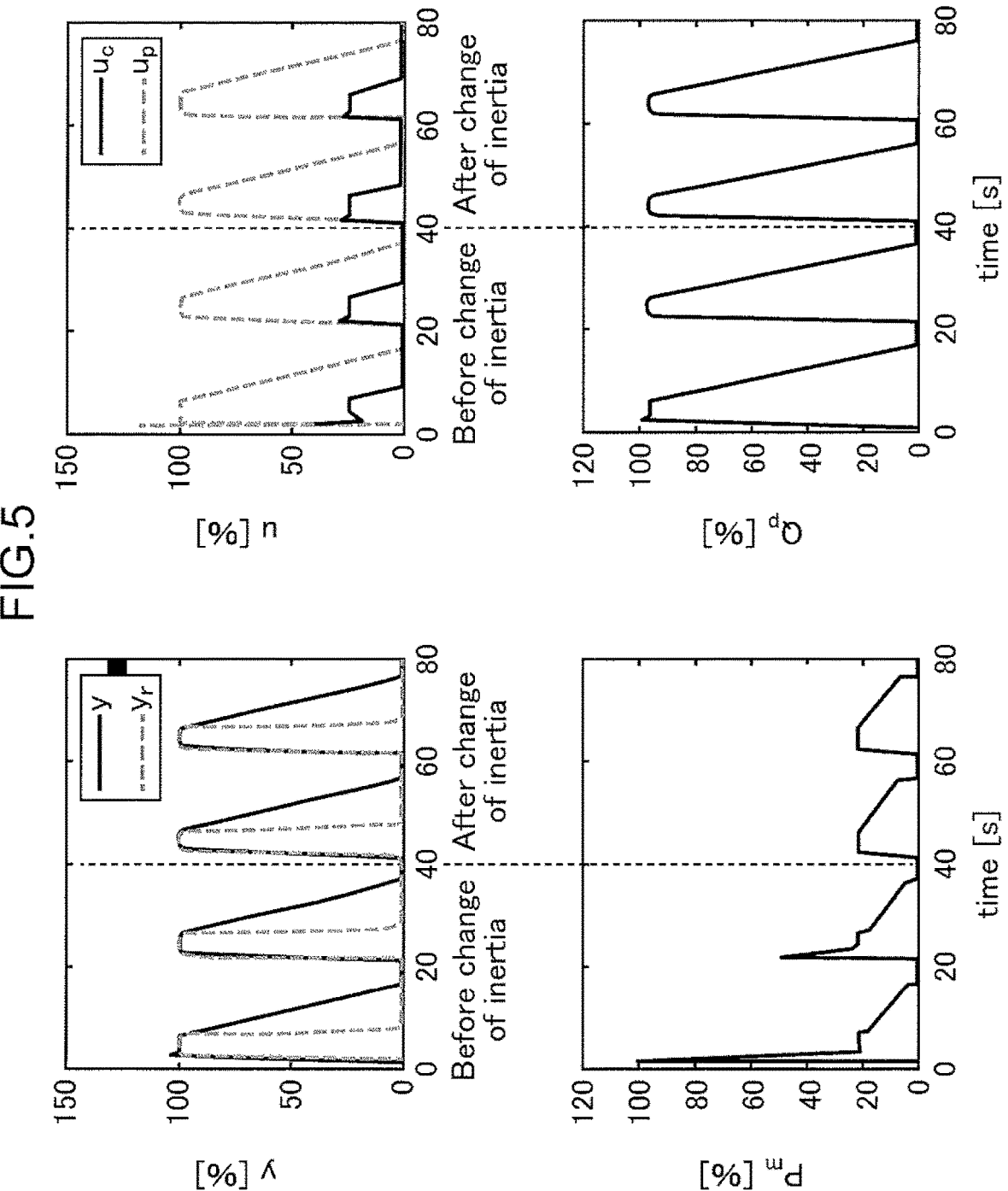
FIG. 5 includes graphs each showing a result of applying the control device to the hydraulic motor control system.
Figure 6:
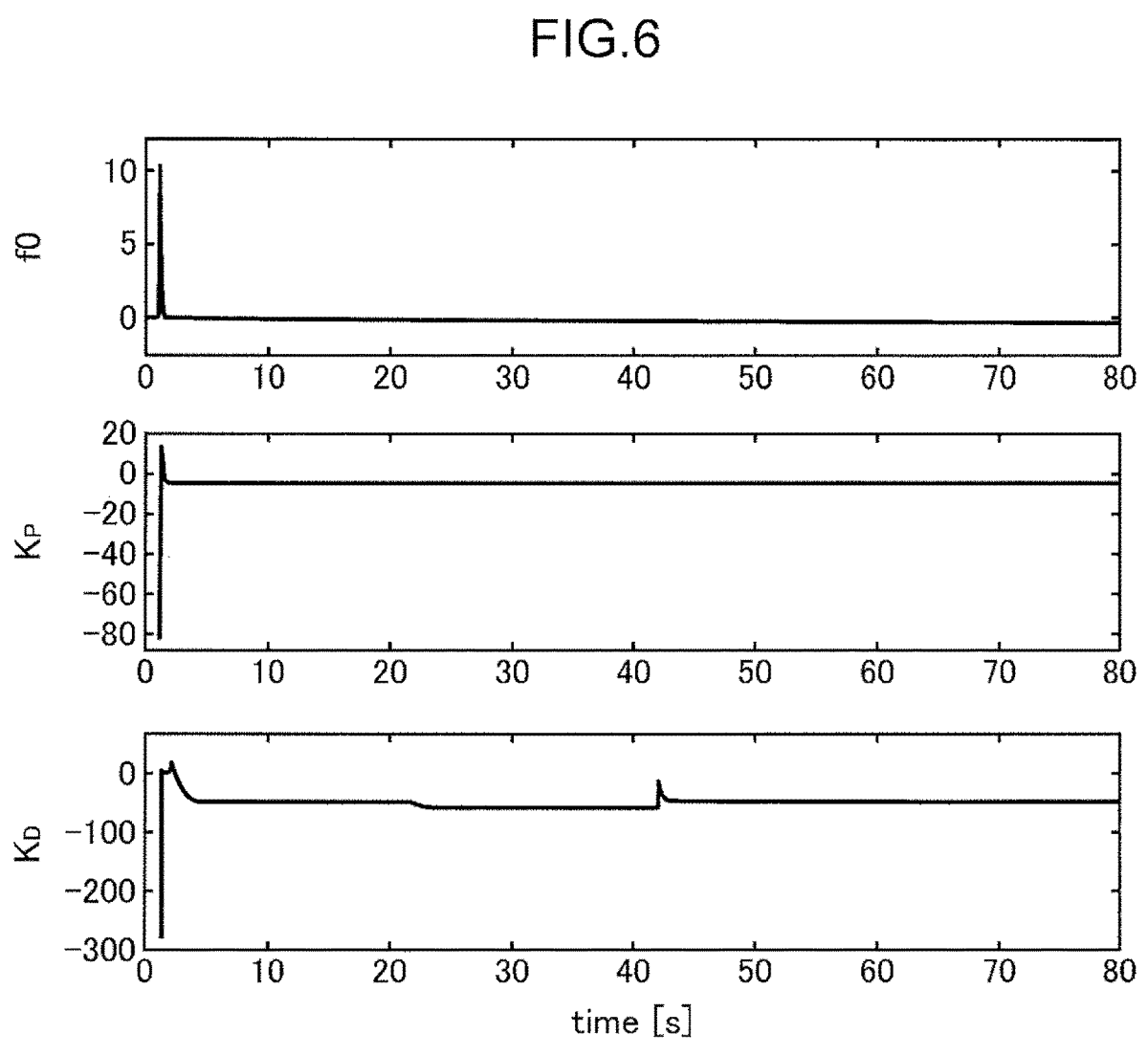
Figure 7:
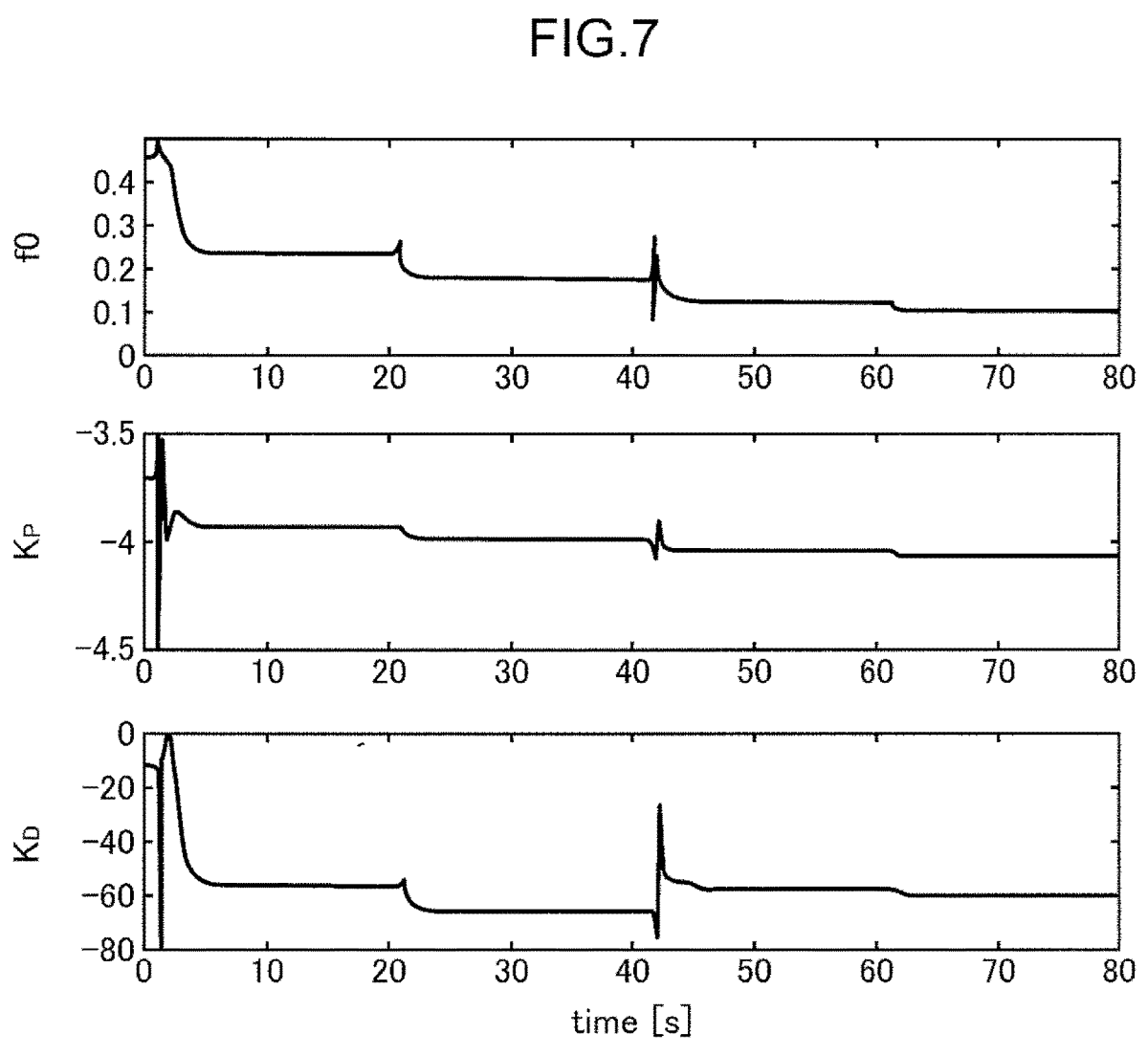

Next, a simulation result will be described. FIG. 5 includes graphs each showing a result of applying the control device 1 to the hydraulic motor control system. FIG. 6 includes graphs showing respective results of adjusting the static gain $f_0$, the proportional gain $K_p$, and the derivative gain $K_D$. FIG. 7 includes enlarged graphs of the graphs in FIG. 6.

As shown in FIG. 5, in the simulation, the inertial moment of the inertial article 405 is changed to $\frac{1}{10}$ at a lapse of 40[s] from a start. Here, the control output y is reduced in a ramp shape when the ideal output $y_r$ fluctuates from 100 to 0, for the operational convenience of a real machine. In FIG. 5, each of the ideal output $y_r$, the control output y, the control input $u_s$, the actual input $u_p$, the pressure $P_m$, and the discharge flow rate $Q_p$ is normalized.

In a transient response shown in FIG. 5, it is understood that the control output y corresponding to the rotation number $N_m$ of the hydraulic motor 404 follows the ideal output $y_r$ even after a fluctuation in the inertial moment. This is because the static gain $f_0$, the proportional gain $K_p$, and the derivative gain $K_D$ are tuned in accordance with the fluctuation in the inertial moment as shown in FIG. 6 and FIG. 7.

By contrast, it is understood from FIG. 5 that the control input $u_c$ from the controller 4 does not largely fluctuate before and after the fluctuation in the inertial moment. It is seen from these perspectives that the upstream controller 4 operates without any influence of the fluctuation in the input and output characteristics of the downstream control loop 50.

Conclusively, in Example, the static gain $f_0$, the proportional gain $K_p$, and the derivative gain $K_D$ are adjusted online. Therefore, the input and output characteristics of the control loop 50 agree with the ideal input and output characteristics of the input and output model $G_m(z^{-1})$ even when the characteristics of the controlled object 100 fluctuate. As a result, the controller 4 can be designed on the basis of the ideal input and output model $G_m(z^{-1})$. This consequently achieves simplification of the design of the controller 4 and facilitates development of the control device 1. Furthermore, influence on the entirety of the control device 1 by the fluctuation in the input and output characteristics of the downstream control loop 50 can be suppressed.

SUMMARY OF EMBODIMENT

A control device according to one aspect of the present invention is a control device that controls a controlled object. The control device includes: a controller that calculates a control input to eliminate an error between a target output and a control output which is output from the controlled object; a static compensator that calculates, on the basis of a static parameter and the control input, a static compensatory input to compensate a fluctuation in static characteristics of the controlled object; a dynamic compensator that calculates, on the basis of a dynamic parameter and the control output, a dynamic compensatory input to compensate a fluctuation in dynamic characteristics of the controlled object; an ideal output calculator that calculates an ideal output responsive to the control input by using an input and output model defining an ideal input and output relation between the control input and the control output; and a parameter adjuster that adjusts each of the static parameter and the dynamic parameter to minimize a difference between the control output and the ideal output.

According to this configuration, each of the static parameter and the dynamic parameter is adjustable without being fixed. Hence, the controller of the control device in the initial design is adoptable to appropriately control the controlled object even when the input and output characteristics of the controlled object largely fluctuate. Specifically, an ideal output responsive to the control input is calculated by using an input and output model indicating ideal input and output characteristics of the control input and the control output, and a static parameter belonging to the static compensator and a dynamic parameter belonging to the dynamic compensator are adjusted to minimize a difference between the ideal output and the control output. In this manner, even when the input and output characteristics of the controlled object largely fluctuate, the input and output characteristics of the control input and the control output are maintained to the ideal input and output characteristics. Hence, even when the input and output characteristics of the controlled object largely fluctuate, the controlled object is appropriately controllable by using the controller in the initial design. This consequently achieves simplification of the design of the controller and facilitates development of the control device.

Besides, this configuration adjusts the static parameter and the dynamic parameter by using the ideal output and the control output each calculated in the operation of the controlled object. Thus, an online adjustment of adjusting the static parameter and the dynamic parameter is attainable in the operation of the device including the controlled object without stopping the operation. By contrast. Patent Literature 1 needs to stop or suspend the operation of the device to adjust a parameter of the compensator due to the lack of prospect of such adjustment of the parameter.

Moreover, the control input is modified by the dynamic compensatory input calculated on the basis of the dynamic parameter and the control output, and thus, a fluctuation in the dynamic characteristics of the controlled object, such as rise characteristics and damping characteristics, can be compensated. Additionally, the control input is modified by the static compensatory input calculated on the basis of the control input and the static parameter, and thus, a fluctuation in the static characteristics of the control characteristics, such as a fluctuation in a scale of the control input accompanied by synthetization with the dynamic compensatory input, is suppressible.

In the control device, the dynamic parameter may include a proportional gain and a derivative gain, the dynamic compensator may calculate, as the dynamic compensatory input, a sum of a value obtained by multiplying the control output by the proportional gain and a value obtained by multiplying a differential value of the control output by the derivative gain, and the parameter adjuster may adjust each of the static parameter, the proportional gain, and the derivative gain to minimize the difference between the control output and the ideal output.

This configuration calculates, as the dynamic compensatory input, a sum of: the value obtained by multiplying the control output by the proportional gain; and a value obtained by multiplying a differential value of the control output by the derivative gain, and thus can accurately compensate the fluctuation in the dynamic characteristics of the controlled object. Further, the static parameter, the proportional gain, and the derivative gain each adjusted in this manner are used to modify the control input. Hence, even when the input and output characteristics of the controlled object largely fluctuate, the controlled object is appropriately controllable by using the controller in the initial design.

In the control device, the parameter adjuster may adjust the static parameter and the dynamic parameter by using recursive least squares.

This configuration adjusts the static parameter and the dynamic parameter by using the recursive least squares, and thus, adjusts the static parameter and the dynamic parameter in real time. As a result, when the input and output characteristics of the controlled object largely fluctuate, the static parameter and the dynamic parameter are promptly adjustable, and the controlled object is appropriately controllable.

In the control device, the synthesizer may calculate, as the actual input, a value obtained by subtracting the dynamic compensatory input from the static compensatory input.

This configuration calculates an actual input by subtracting the dynamic compensatory input from the static compensatory input, and therefore, the actual input is easily calculatable.

In the control device, the controlled object may include a hydraulic system having: a hydraulic pump; an electric motor that drives the hydraulic pump; and an actuator that comes into operation owing to hydraulic fluid supplied from the hydraulic pump. The hydraulic system may output a state value of the actuator as the control output, and the synthesizer may calculate an instructive value to the electric motor as the actual input.

The hydraulic system has input and output characteristics which may largely fluctuate when, for example, the temperature of hydraulic fluid changes. For instance, when a hydraulic excavator is used as the hydraulic system, a weight and an inertia change in accordance with soil and sand scooped by a bucket, and accordingly, the input and output characteristics of the hydraulic system may largely fluctuate. This configuration adjusts the static parameter and the dynamic parameter to cope with the fluctuation, and thus achieves an appropriate control of the hydraulic system.

The invention claimed is:

1. A control device that controls a controlled object, comprising:

control circuitry configured to calculate a control input to eliminate an error between a target output and a control output which that is output from the controlled object;

a static compensator circuit configured to calculate a static compensatory input to compensate for a fluctuation in static characteristics of the controlled object by multiplying the control input by a static gain;

a dynamic compensator circuit configured to calculate, as a dynamic compensatory input a sum of a value obtained by multiplying the control output by a proportional gain and a value obtained by multiplying a differential value of the control output by a derivative gain to compensate for a fluctuation in dynamic characteristics of the controlled object;

a synthesizer circuit configured to calculate, as an actual input, a value obtained by subtracting the dynamic compensatory input from the static compensatory input, and input the calculated actual input to the controlled object to control the controlled object;

an ideal output calculator circuit configured to calculate an ideal output responsive to the control input by using an input and output model defining an ideal input and output relation between the control input and the control output; and a parameter adjuster circuit configured to adjust each of the static gain, the proportional gain, and the derivative gain by using recursive least squares to minimize a difference between the control output and the ideal output.

2. The control device according to claim 1, wherein the controlled object includes a hydraulic system having a hydraulic pump; an electric motor that drives the hydraulic pump; and an actuator that comes into operation in response to hydraulic fluid supplied from the hydraulic pump, the hydraulic system outputting a state value of the actuator as the control output, and the synthesizer circuit is further configured to calculate an instructive value to the electric motor as the actual input.

\* \* \* \* \*